June 17, 1941.   C. E. SMITH   2,246,146
HARDNESS TESTING MACHINE
Filed Oct. 3, 1938   2 Sheets-Sheet 1
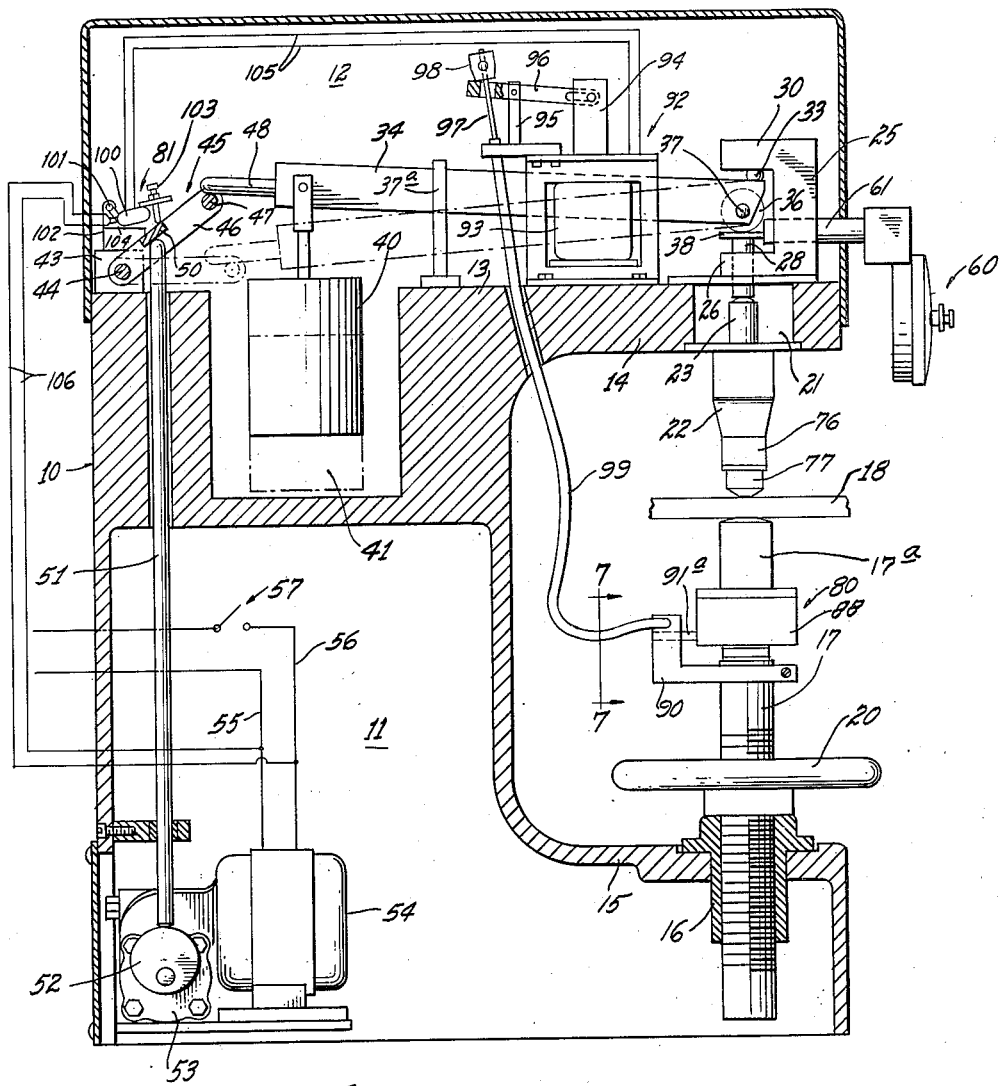
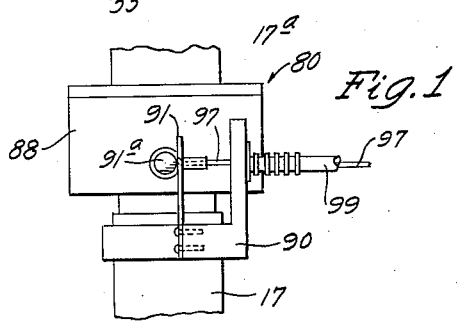
Fig. 1
Fig. 7
Inventor
CLARENCE E. SMITH.
By
Attorneys

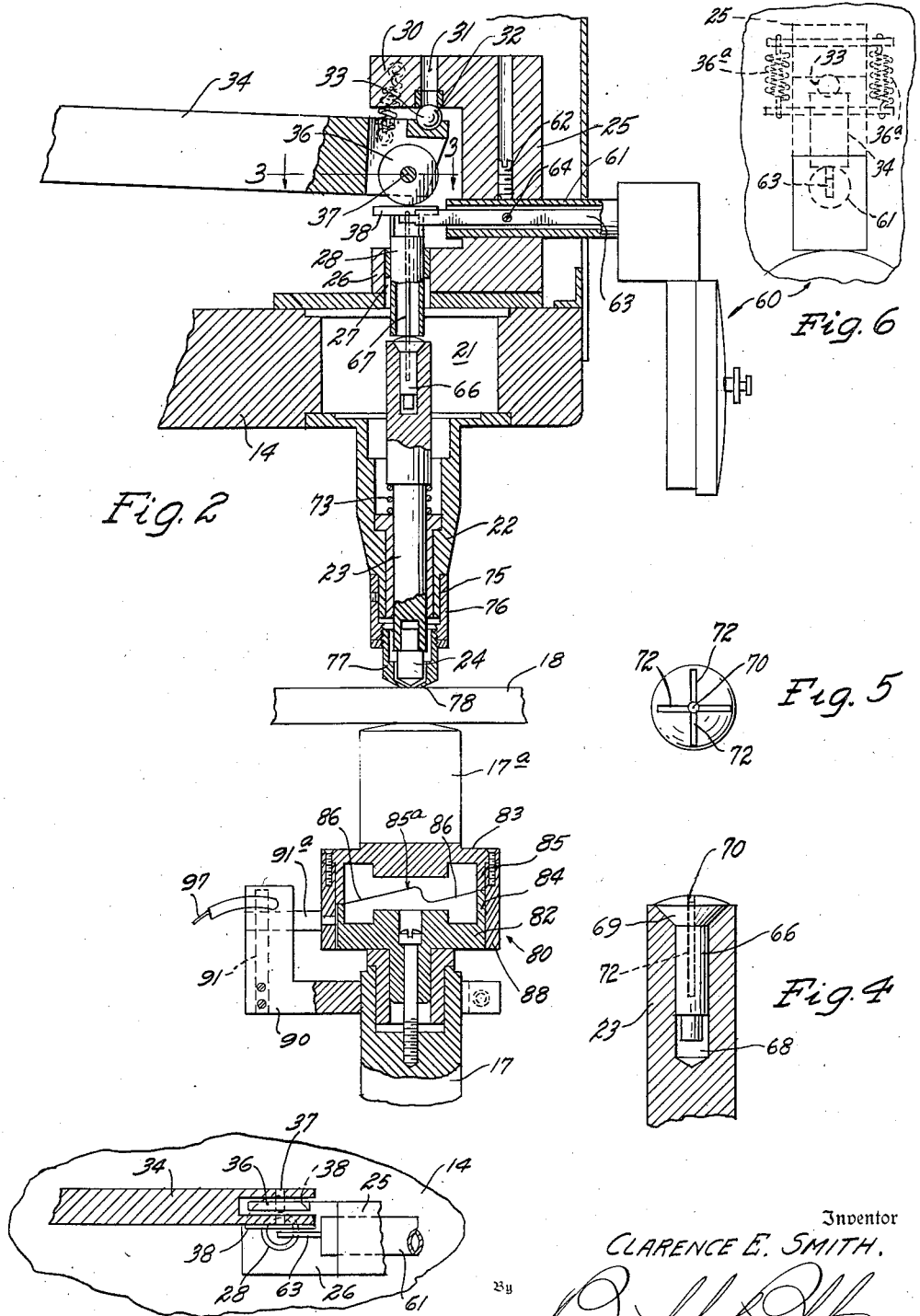

Patented June 17, 1941

2,246,146

UNITED STATES PATENT OFFICE 2,246,146

HARDNESS TESTING MACHINE

Clarence E. Smith, Dearborn, Mich., assignor to Pyro-Electro Instrument Co., Detroit, Mich., a corporation of Michigan Application October 3, 1938, Serial No. 233,048

9 Claims. (Cl. 265—12)

This invention relates generally to hardness testing machines and more particularly to automatically operable hardness testing machines.

In the past, hardness testing machines have been provided which have been efficient in giving a substantially accurate indication of the hardness of materials, but insofar as I am aware, all of these machines have been hand operated machines with the speed of operation or production of tested parts depending largely upon the operator of the machine. In the testing of the hardness of materials, such as metallic parts, a so-called minor load is first applied to the material to penetrate the outer skin or crust thereof to a point where an average hardness reading on the material may be obtained. Usually, the minor load is applied by raising the material under test, on an adjustable support against a penetrator until an indicator registers the desired minor load to be applied after which the major load is applied to the material. The application of the so-called minor load on hand operated machines requires time, and the accuracy with which the load is applied, particularly in view of variations in the gauges of materials to be tested, depends somewhat upon the skill of the operator.

Accordingly, it is an object of the present invention to provide a new and improved hardness testing machine which is entirely automatic in operation, requiring only manual feeding of material to the machine.

Another object of the invention is to provide a new and improved hardness testing machine in which application of the minor load by an operator is eliminated.

Another object of the invention is to provide a new and improved hardness testing machine which automatically compensates for variation in gauge of materials to be tested.

Other objects of the invention will become apparent from the following description taken in connection with the accompanying drawings, in which—

Figure 1 is a view partly in elevation and partly in section of a hardness testing machine embodying my invention;

Fig. 2 is an enlarged fragmentary view partly in elevation and partly in section of certain of the operating parts of the machine;

Fig. 3 is a view shown partly in section taken along the line and in the direction of the arrows 3—3 of Fig. 2;

Fig. 4 is a view in section of a clutch part employed in the machine;

Fig. 5 is a top plan view of the part shown in Fig. 4;

Fig. 6 is a fragmentary end view of the machine looking from right to left of Fig. 2, and Fig. 7 is a detail view in side elevation taken in the direction of the arrow 7—7 of Fig. 1.

Referring to the drawings by characters of reference, the present hardness testing machine includes a casing 10 having a lower compartment 11 and an upper compartment 12 separated by a horizontal wall 13 which includes an extended wall portion 14 projecting over and vertically spaced from an extended base portion 15 of the casing. Secured in the extended base portion 15, an open ended, internally threaded tubular member or fitting 16 is provided and receives a vertically adjustable, externally threaded screw 17 which carries a supporting member 17a for supporting material, as at 18, to be tested. The screw 17 may be raised and/or lowered by any suitable means, such as for example, by a hand wheel 20 which may be secured to the screw in any suitable manner. The hand wheel 20 being secured to the screw 17 and the internally threaded fitting 16 being secured to the base, the screw may be raised and/or lowered by rotation of the hand wheel.

Immediately overlying the adjustable support 17a, the extended casing wall portion 14 is provided with an aperture or bore 21 therethrough which is closed at its lower end by a tubular open ended guide member 22 which slidably receives and guides a vertically reciprocal supporting member or rod 23, Fig. 2, to the lower end of which a penetrator 24, preferably a pointed diamond, is secured. Rigidly mounted on the extended wall portion 14, within the upper compartment 12, a U-shaped supporting block 25 overlies the opening 21 and through one, or its lower leg, as at 26, is provided an aperture 27 to receive a tubular member 28, the lower end of the tubular member 28 abutting the upper end of the supporting rod 23. In the upper leg, as at 30, of the U-shaped block 25, a vertical bore 31 is provided therethrough and in its lower end a tubular insert provides a downwardly facing seat 32 for a ball 33 which serves as a fulcrum or pivot for a lever or beam 34 which adjacent one end thereof is provided with an upwardly facing socket to receive the ball 33. The pivoted end of the lever 34 is preferably bifurcated to receive a roller 36 which rides on the upper end of the tubular member 28 to reduce friction between the parts, the roller being mounted on the lever by a pivot pin 37. A pair of helical coil springs 36a under tension is provided and acts to retain the ball pivot 33 on its seat. A pair of vertically extending guide members 37a of which only one is shown, Fig. 1, may be provided on opposite sides of the lever 34 to limit lateral or side movement thereof. The upper end of the tubular member 28 may have an external flange 38 to provide an enlarged abutment or bearing surface for the roller 36, but this flange 38 is interrupted, or is substantially semi-circular as shown in Fig. 3 so that the upper end as well as the lower end of the tubular member 28 is open. With this arrangement, the roller 36 is arranged to ride on the upper surface of the flange 38, offset from the vertical or longitudinal axis of the tubular member 28.

Pivoted to the lever 34, adjacent the end which is opposite the lever fulcrum, is a depending predetermined weight 40 which is operable to exert a force through the lever 34, and member 28, to urge the penetrator 24 downwardly and penetrate the material 18 to test the hardness thereof. The casing wall 13 may be provided with a recess 41 to receive the weight member 40. Integral with and projecting upwardly from the wall 13 on the opposite side of the weight, from the penetrator is a pair of lugs 43, only one of which is shown and these lugs support a pivot pin 44 on which an oscillatory lever or rocker member 45 is pivoted to raise and lower the weight member 40. In the present instance, the lever member 45 comprises two spaced, substantially parallel arms 46, only one of which is shown, and connecting the arms 46 is a pin 47 on which a reduced extended portion 48 of the lever 34 rides. Intermediate their ends, the lever arms 46 are integrally joined by a transversely extending abutment member 50 against the underside of which the rounded upper end of a vertically reciprocal push rod 51 abuts, the push rod 51 being actuated by a cam or eccentric 52 which is rotated through suitable speed reduction gears in a casing 53, by an electric motor 54, located in the lower compartment 11. Lead wires 55, 56 lead to the electric motor 54 and a manually operable switch 57 may be provided in the line 56 to start and/or stop operation of the motor 54.

Mounted on the casing 10, externally thereof, is an indicator 60 for indicating the hardness of material in accordance with the operation of the penetrator and the indicator 60 may be of any suitable type. In general, the indicator 60 comprises a casing containing a rotatable pointer biased in one direction by a spring (not shown). The indicator 60 is mounted on the outer end of an open ended tube 61 which projects into the casing through a bore in the supporting block 25 to which the tube may be rigidly secured by a set screw 62, Fig. 2. Extending within and longitudinally of the tube 61, an operating lever 63 has its opposite ends projecting from the tube and is operatively connected to the indicator 60, the operating lever 63 being pivoted intermediate its ends on a pivot pin 64 having its opposite ends secured in and to the side wall of the tube.

In order to provide a completely automatic hardness testing machine by means of which parts may be tested at a high rate of speed and one in which the application of the minor load is not dependent upon the skill of the operator, I provide a lost-motion connection or slip clutch for operatively connecting the indicator operating lever 63 and the penetrator 24. This clutch comprises a clutch member 66 carried by the penetrator supporting member 23 and a cooperating clutch member 67 carried by the indicator operating lever 63. The clutch member 66 is in the form of a pin having a shank which fits into a bore 68 in the upper end of the penetrator support 23 and having a conical head 69 which is received in a chamfer in the upper end of the bore 68. The head 69 projects above the upper end of the penetrator support 23 and is rounded, the lower open end of the tubular member 28 seating on the rounded head of the clutch member. The clutch member 66 is provided with a bore 70 which opens through the rounded upper surface of the head 69 to receive the other clutch member 67 which may be in the form of a wire. The upper end of the wire or clutch member 67 is secured to the inner end of the indicator operating arm 63 and the wire depends therefrom extending through the tubular member 28 into the bore 70 of the other clutch member 66. The upper end portion of the clutch member 66 is provided with a plurality of slots 72 which open through the upper rounded surface of the head 69 and intersect the central bore 70 which receives the wire clutch member, which slots provide for peripheral expansion and contraction of the upper end portion of the clutch member 66. When the clutch member 66 is expanded its bore 70 is slightly larger in diameter than the diameter of the wire or clutch member 67 permitting relative movement of the clutch members, but upon predetermined pressure on the rounded head of the clutch member 67 by the weight 40 via the lever 34 and tubular member 28, the upper end portion of the clutch member 66 contracts peripherally, gripping the wire clutch member 67 and establishing operative connection between the indicator 60 and the penetrator 24. A coil spring 73, Fig. 2, surrounds the penetrator support 23 within the guide 22 and acts to move the penetrator upwardly on upward movement of the weight 40 to its inactive or ineffective position.

A lower end portion of the tubular member 22 is reduced, as at 75, to receive an open ended sleeve 76 which is rigidly secured thereto, and the sleeve is internally threaded at its lower end to receive a tubular guard and gauge 77 for the penetrator 24. The tubular guard 77 surrounds the penetrator 24 and is provided with a lower end wall 78 which conforms in shape to the lower conical or pointed end of the penetrator. The end wall 78 is frusto-conical having a downwardly facing, flat seating surface for abutment with the upper surface of the material 18, the wall 78 being provided with an aperture for projection of the pointed end of the penetrator externally of the guard upon predetermined downward movement of the penetrator.

In order to compensate automatically for variations in thickness or gauge of a number of pieces of material tested, the support 17a is vertically movable relative to the screw 17 in accordance with the operation of the machine. To this end, a cam mechanism 80 interposed between the screw 17 and the support 17a, is provided and is controlled by a control or tilt switch 81, Fig. 1, which is actuated in accordance with the operation of the penetrator 24. The cam mechanism 80 comprises a lower cam member 82 and an upper cam follower 83, the cam 82 being rigidly secured to the screw 17 and the follower 83 being integral of the support 17a. The cam 82 and the follower 83 are provided with extended annular flanges 84 and 85 respectively, on the ends of which are provided complementary cam surfaces 85a. These cooperating cam surfaces 85a are provided with a plurality of spaced risers 86, the angles of which risers are the same and these riser surfaces 86 are only slightly inclined with respect to the horizontal so that together with the large contact area of the cam and follower surfaces, frictional resistance is provided which will resist and prevent rotation and downward movement of the support 17a by and upon application of the force or weight 40. Surrounding the cam 82 and follower 83, a sleeve 88 is provided which is secured to the cam follower 83 for rotation therewith and cooperates with the cam 82 to guide the follower.

Rigidly secured to the screw 17, a laterally extending bracket 90 is provided to which one end of a spring 91 is secured, the spring 91 acting against a laterally extending pin 91a which has one end secured in and to the wall of the rotatable sleeve guide 88. The spring 91 is adapted to rotate the sleeve and cam follower 83 to bring the material to be tested up against the lower end of the penetrator guard 77 which serves as a stop. The spring 91 and friction of the engaging cam and follower surfaces are overcome by a solenoid 92, controlled by the aforementioned tilt switch 81. The solenoid 92 may be mounted on the casing wall 14 in the upper chamber 12 and is of the usual well known type having a coil 93 and a movable core 94. Mounted on the solenoid, a bracket 95 supports a lever 96 one end of which is pivotally connected to the solenoid core 94. The other end of the lever 96 is provided with an aperture to receive one end of a wire 97 to which is secured a stop or abutment member 98 for abutment with the lever, the other end of the wire being secured to the pin 91a of the rotatable cam follower 83. The wire 97 is enclosed in a flexible tube 99.

The control or tilt switch 81, Fig. 1, is of the mercury type including a closed tube 100 containing a pair of spaced contacts (not shown) arranged to be connected or bridged by the mercury upon tilting of the switch or tube in counterclockwise direction facing Fig. 1. The switch 81 is pivoted, as at 101, to a bracket 102 which is mounted on the supporting block 43 adjacent the lever member 45. An adjustable abutment member 103, which may be a screw, is screwthreaded into an arm carried by the switch tube 100 and is arranged so that its lower end rides on the upper surface of the lever abutment member 50. Pivotal movement of the switch downwardly or in a clockwise direction is limited to an upwardly facing seating surface 104 of the bracket 102 and in the "down" position of the switch, the circuit to the solenoid 92 is open. Suitable lead wires 105 connect the switch 81 to the solenoid 92 and other lead wires 106 connect the switch to the lead lines 55, 56 of the electric motor 54. It will be seen that upon closing the manual switch 57, the motor 54 starts to operate and that the tiltable switch 81 becomes effective to control the solenoid 92 in accordance with the operation of the penetrator by the motor.

In the operation of the present machine, on closing of the switch 57, the electric motor 54 rotates the cam 52 which raises and lowers the vertical push rod 51 to rock the lever 45 which in turn pivots lever 34 to apply and remove the force of weight 40 on the penetrator 24. As previously mentioned, the spring 91 is adapted to rotate the cam follower 83 to raise the material 18 to be tested against the lower end of the penetrator guard 77 and the solenoid 92 is adapted to overcome the spring and friction between the engaging cam and follower to return the cam follower and therefore the work support 17a to their down positions. When the work support 17a is in its "down" position a piece of material 18 to be tested is positioned thereon, as shown and in the "down" position of the support, the solenoid 92 is deenergized so that the spring 91 is free to rotate the cam follower 83 in the direction to raise the work or part 18 to be tested against the penetrator guard 77. During upward movement of the weight 40, the switch 81 is tilted to close the circuit to the solenoid 92 just prior to the weight reaching its "up" position. Upon slight downward movement of the weight 40, the solenoid 92 is deenergized and the work support 17a is raised by the spring rotating the cam follower 83. By reason of the lost motion connection between the wire 97 and the solenoid operated lever 96, it will be seen that the spring 91 will not have to work against the solenoid core which is usually moved in one direction by a spring (not shown) upon deenergization of the solenoid. When the weight 40 is lowered, the tubular member 28 and the penetrator carrier are moved downward, the penetrator 24 projecting through the opening in the lower end of the guard 77 and entering or penetrating the material or part 18 under test. During the initial penetration of the material 18, there is a lost-motion or slipping between the cooperating clutch members 66 and 67 with the result that the indicator is not operated during this initial penetrating movement of the penetrator which constitutes the application of the minor load. However, after a pre-determined penetration of the material under test, a back force opposed to the weight 40 is built up which results in peripheral contraction of the upper end portion of the clutch member 66 which then grips or clutches the wire clutch member 67 to operate the indicator 60 to register the major load or average hardness of the material 18. The motor driven cam then moves the weight 40 upward through operation of the push rod 51, rocker member 45 and lever 34 to the inactive position of the weight, which permits the spring 73 to move the penetrator 24, its holder 23 and the tubular member 28 upwardly. Upon removal of the major load, the upper end of the clutch member 66 expands and releases the wire clutch member 67, the indicator pointer returning to its starting position. It will be seen that during operation of the machine, the cam 52 raises and lowers the weight 40 and all that the operator need do is to feed the parts to be tested to the machine.

From the foregoing description it will be seen that I have provided a new and improved hardness testing machine which is efficient and entirely automatic in operation. It will further be seen that the present machine, by reason of the slip clutch which operatively connects the penetrator and the indicator, that high production may be obtained with the machine since the minor load is automatically applied. In addition, it will be appreciated that I have provided a hardness testing machine in which variations in gauge of a number of parts to be tested is compensated for automatically.

While I have shown and described in detail a specific form of my invention it is to be understood that various changes may be made without departing from the spirit or scope of the invention which is to be limited only by the appended claims.

What I claim is:

1. In a hardness testing machine, a supporting member for the material to be tested, a penetrator movable toward and away from said supporting member, said supporting member being movable toward and away from said penetrator, a lever for moving the penetrator in one direction, a weight member carried by said lever to exert a predetermined force and urge the penetrator into the material under test, said weight member having an inactive position on pivoting of the lever to one position, electrically operated means to move said supporting member toward and away from said penetrator, a second lever, said second-named lever loosely abutting said first-named lever, switch means operable by said second-named lever and controlling said electrically operated means, a push rod connected to said second-named lever, cam means to reciprocate said push rod, and means operable to actuate said cam means.

2. In a hardness testing machine, a supporting member for the material to be tested, a reciprocal penetrator movable toward and away from said supporting member, a lever operatively connected to said penetrator, a weight member carried by said lever and on pivoting of the lever in one direction exerting a force to urge said penetrator into the material under test, means to pivot said lever, an expansible-contractible member acted on by the force of said weight member and carrying said penetrator, said expansible-contractible member having an opening variable in capacity upon expansion and contraction of said member and contractible by the force of said weight member, an indicator for indicating the hardness of the material under test, means operatively connecting said indicator and said penetrator and extending into said opening, said expansible-contractible member on initial penetration of the material under test contracting to grip said connecting member to actuate said indicator.

3. In a hardness testing machine, a supporting member for material to be tested, a penetrator movable toward and away from said supporting member, means operable to exert a force to urge said penetrator into the material under test, a supporting member for said penetrator and having an expansible-contractible aperture, an abutment member seating in said second-named supporting member and acted against by said force exerting means to actuate said penetrator and contract said aperture, an indicator for indicating the hardness of the material under test, a connecting member for operatively connecting said second-named supporting means and said indicator, said connecting member extending into said aperture for clutching action with said second-named supporting member after initial penetration of the material under test.

4. In a hardness testing machine having penetrator means operable by force exerting means and having indicator means for indicating hardness of material under test, loss motion connecting means for the penetrator and the force exerting means comprising a movable member operatively connected to one of the means, a second movable member operatively connected to the other of the means and cooperable with said first-named member, one of said members having a passage to receive the other of said members and contractible upon and in accordance with the application of a predetermined force acting to urge the penetrator means into material under test to operatively connect the penetrator means and the indicator means.

5. In a hardness testing machine, a supporting member for material to be tested, a movable penetrator member for penetrating the material, one of said members having an initial movement toward the other of said members dependent upon the thickness of the material and prior to penetration of the material to obtain desired relative positions of said penetrator member and the material, electrically operated means operable to move said one member toward and away from said other member, means operable to move the penetrator member to penetrate the test material, lever means operatively connecting said last-named means and said penetrator member, and switch means actuated by said lever means and controlling said electrically operated means.

6. In a hardness testing machine, a supporting member for material to be tested, a movable penetrator member, means to exert a force operable to move said penetrator to penetrate the material, one of said members being movable toward the other of said members depending upon the thickness of the material and prior to penetration thereof by the penetrator, means to exert a force operable to move said penetrator to penetrate the material, cam means operable to move said one member toward and away from the other member, spring means to operate said cam means to move said one member in one direction, electrically operated means operable to overcome said spring means and friction of said cam means to move said one member in the opposite direction, switch means controlling said electrically operated means, and means to operate said switch means in accordance with the application of the force.

7. In a hardness testing machine, a supporting member for material to be tested, a movable penetrator member, means operable to exert a force to move said penetrator member, a guard for said penetrator and having an opening, said penetrator being movable upon application of said force exerting means relative to said guard to project through said opening to penetrate the material, one of said members being initially movable toward the other of said members prior to effective application of said force exerting means so that the material will be in contact with said guard, means operable automatically to move said one member toward the other member, and control means operable in accordance with application of said force exerting means to control said last-named moving means.

8. In a hardness testing machine, a movable penetrator for material to be tested, a supporting member for material to be tested and movable toward and away from said penetrator, a weight member operable to exert a force on and move said penetrator to penetrate the material, said weight member having effective and ineffective positions, means including an electric motor to move said weight member to the ineffective position, cam means to move said supporting member, stop means to limit movement of said supporting member toward said penetrator, spring means operable to actuate said cam means to move said supporting member to said stop means prior to effective application of the weight, electrically operated means operable to actuate said cam means to move said supporting member away from said penetrator after application of the weight and also to tension said spring means, and switch means actuated by and in accordance with movement of said weight member and operable to control said electrically operated means.

9. In a hardness testing machine, a work abutment and a penetrator member one movable toward the other, the movable member including a plurality of hollow sections and a collet intermediate said sections, means for applying a predetermined force to one of said sections to transmit the same through said collet to another section and to press the penetrator into the work, a gauge for measuring the depth of penetration, an actuating member for said gauge extending through said hollow sections and into said collet, and means for contracting said collet when a predetermined initial load has been transmitted therethrough to the work to thereby couple said movable member to said gauge and to register the further depth of penetration of said penetrator into the work.

CLARENCE E. SMITH.